United States Patent
Brunel et al.

(10) Patent No.: US 6,589,419 B1
(45) Date of Patent: Jul. 8, 2003

(54) FILTERING MEANS FOR FUEL DRAWING ASSEMBLY

(75) Inventors: Daniel Brunel, Châlons-en-Champagne (FR); Alain Durand, Ermont (FR)

(73) Assignee: Marwal Systems, Chalons-en-Champagne (FR)

( * ) Notice: Subject to any disclaimer, the term of this patent is extended or adjusted under 35 U.S.C. 154(b) by 0 days.

(21) Appl. No.: 09/856,620

(22) PCT Filed: Nov. 4, 1999

(86) PCT No.: PCT/FR99/02695

§ 371 (c)(1),
(2), (4) Date: Sep. 4, 2001

(87) PCT Pub. No.: WO00/31407

PCT Pub. Date: Jun. 2, 2000

(30) Foreign Application Priority Data

Nov. 24, 1998 (FR) .............................................. 98 14763

(51) Int. Cl.⁷ .......................... B01D 27/00; B01D 29/31; B01D 27/08
(52) U.S. Cl. .................... 210/232; 210/450; 210/493.2; 123/509
(58) Field of Search .............................. 210/450, 493.2, 210/232; 123/509

(56) References Cited

U.S. PATENT DOCUMENTS 5,399,264 A * 3/1995 Pulek et al.
5,670,042 A * 9/1997 Clausen et al.

FOREIGN PATENT DOCUMENTS

| DE | 41 40 140 A1 | 6/1963 |
| DE | 94 12 297.1 U | 12/1994 |
| DE | 195 23 626 A1 | 1/1997 |
| DE | 197 18 603 A1 | 11/1997 |
| DE | 197 11 531 A1 | 12/1997 |
| DE | 196 46 350 A1 | 5/1998 |
| EP | 863304 * | 2/1998 |
| FR | 2 272 314 A | 12/1975 |

* cited by examiner

Primary Examiner—Thomas M. Lithgow
(74) Attorney, Agent, or Firm—Foley & Lardner

(57) ABSTRACT

The invention concerns a motor vehicle fuel drawing assembly comprising a housing (200) having a ring-shaped chamber (220) and a filter (100) arranged in said ring-shaped chamber. The invention is characterised in that it comprises at least a plastic annular lip (126, 136), cast in one single piece linked to the housing (200) or to the filter (100), made of a material capable of being elastically deformed, and shaped along an oblique direction relatively to the axis O-O of the filter (100) and the housing chamber (220), such that said lip (126, 136) is urged to rest, with elastic deformation, and along a direction with tangential components by its free end (127, 137), against the surface opposite (286, 296), the other surface of the filter (100) or of the housing (200) arranged substantially transversely to the axis (O-O) of the filter (100) of the housing (200) chamber (220) to ensure tightness at that level between the filter (100) and the housing (200).

16 Claims, 3 Drawing Sheets

Figure 1:
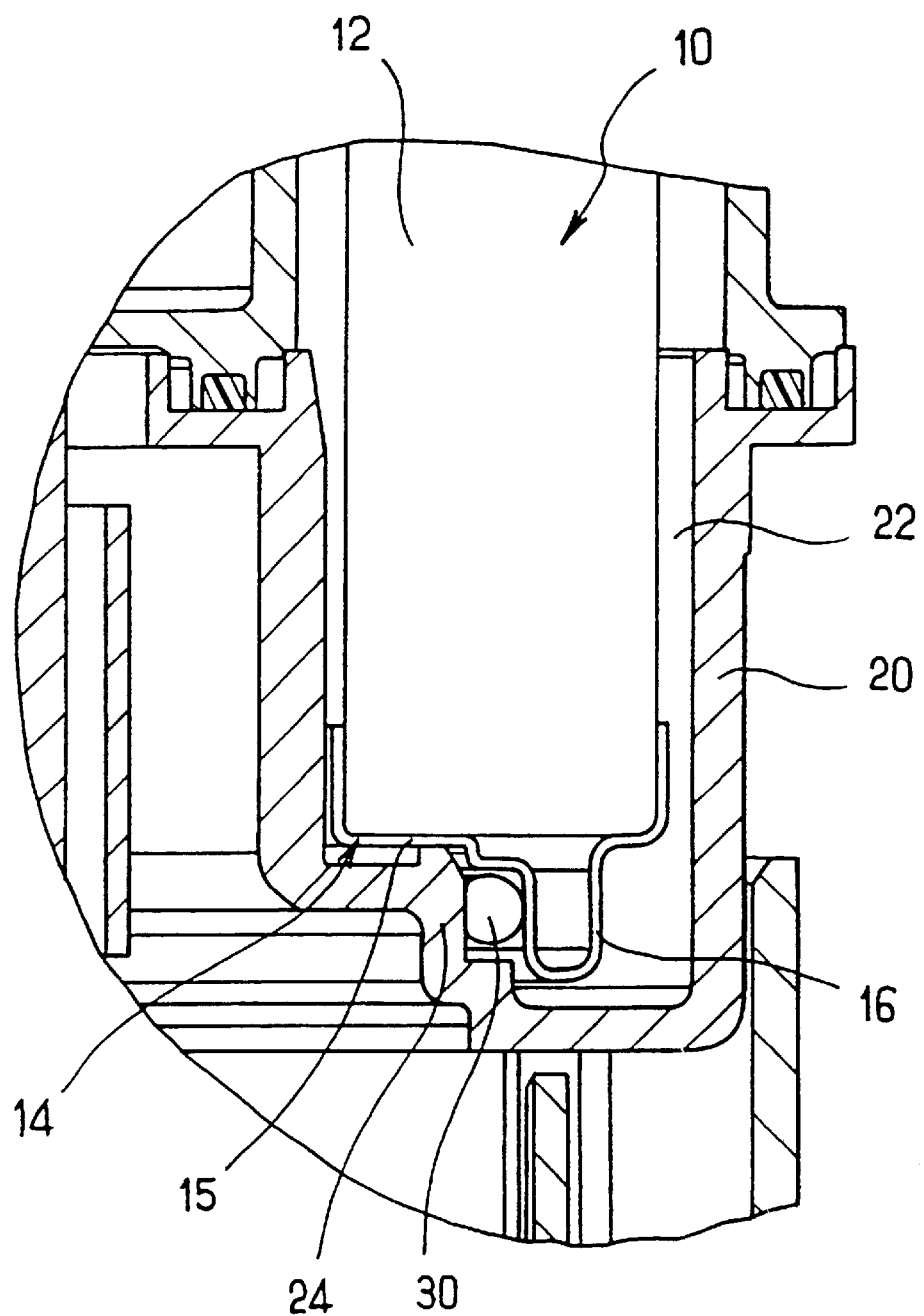

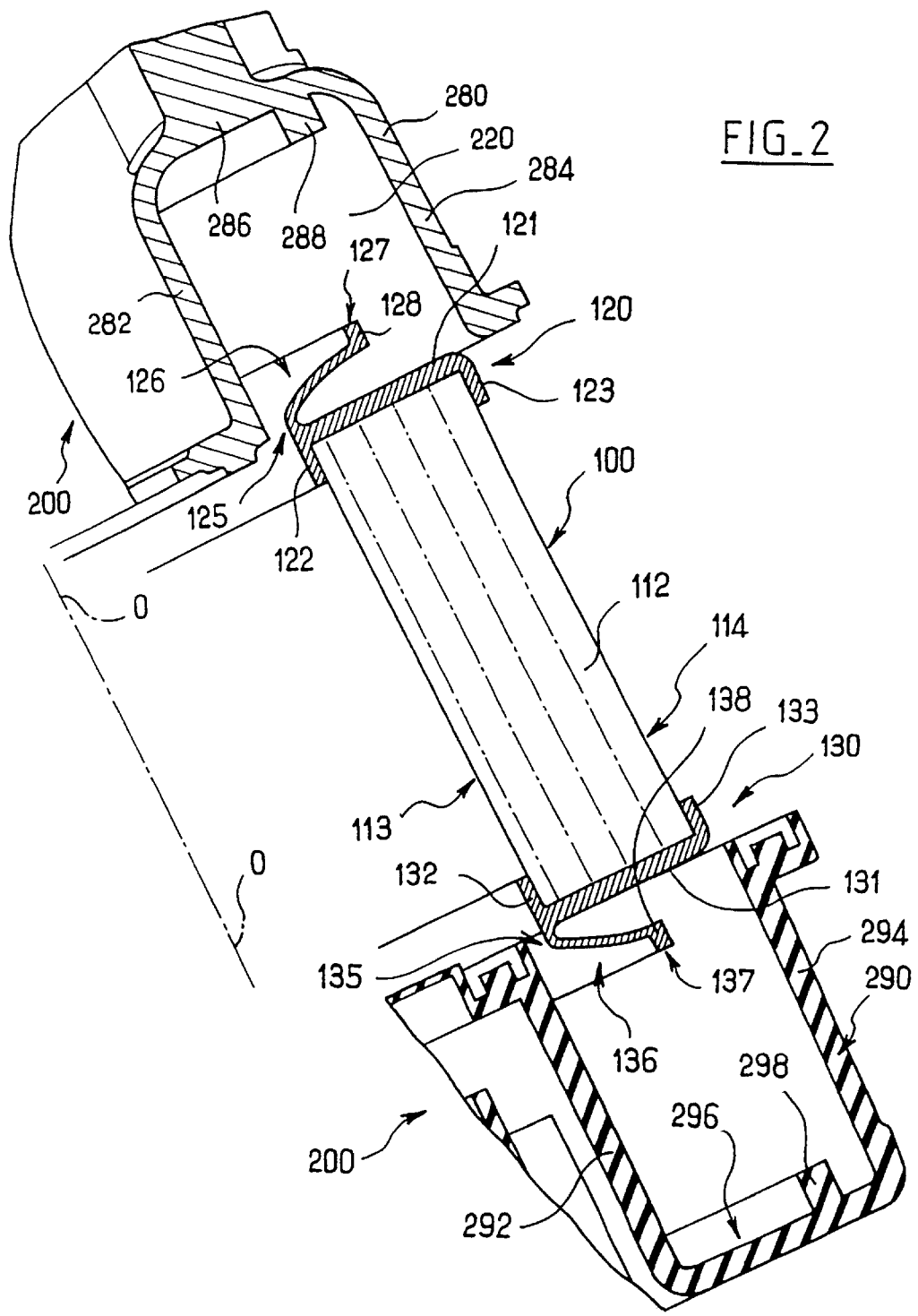
FIG_2

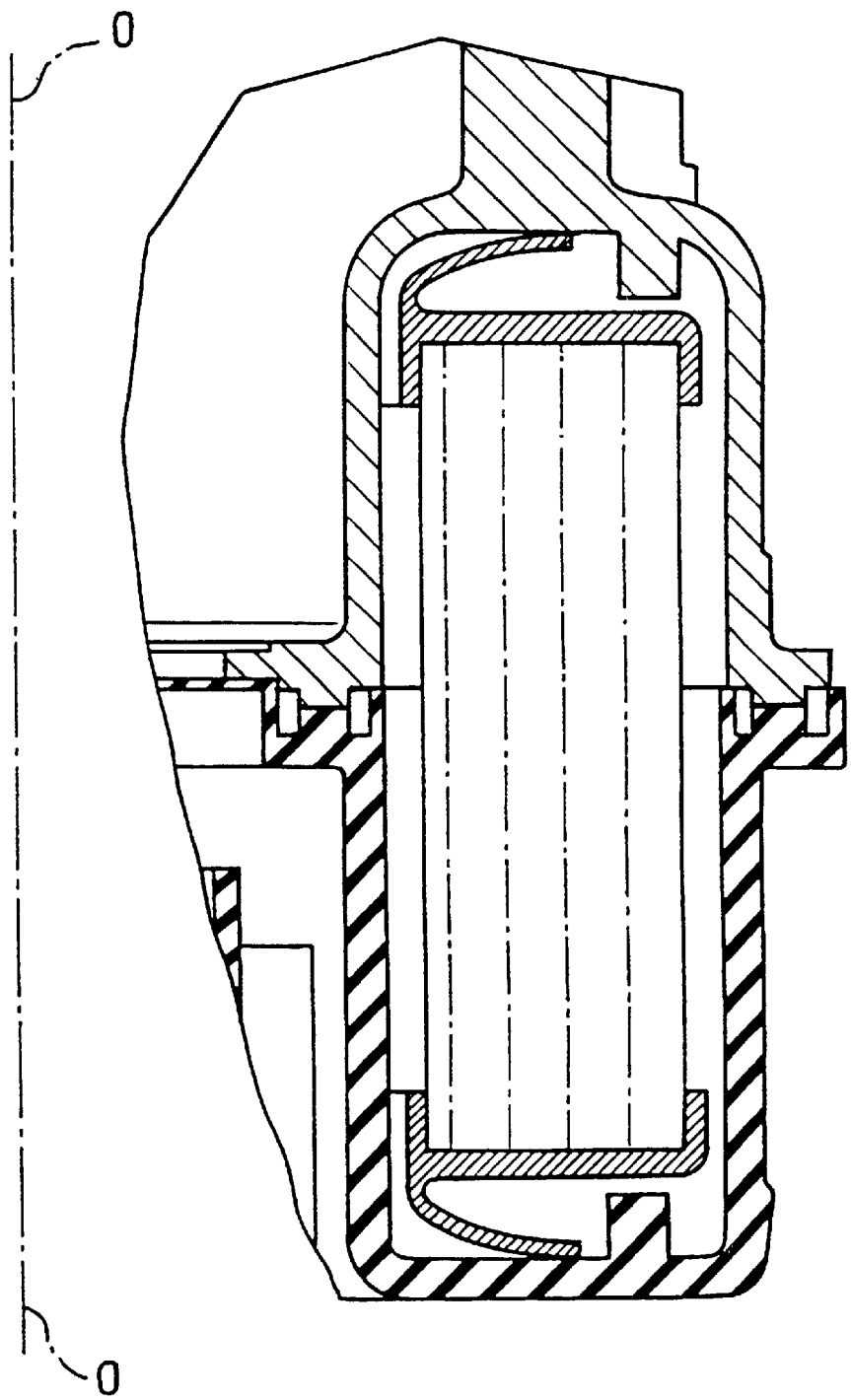
FIG_3

FILTERING MEANS FOR FUEL DRAWING ASSEMBLY

The present invention relates to the field of motor vehicle fuel drawing devices comprising a filter.

Many filter arrangements have already been proposed for such fuel drawing devices.

Illustrated in FIG. 1 attached hereto is an example of an embodiment of a filter proposed by the Applicant company.

This FIG. 1 shows a filter element 10 placed in a plastic housing 20.

The filter element 10 possesses a filter body 12 of annular geometry made for example from a pleated piece of paper, arranged between two annular caps at its axial ends, one of which is the cap marked 14 in FIG. 1. Each of these caps 14 has a generally U-shaped cross section in which the concavity faces toward the filter body 12, and the web 15 possesses a drawn projection 16.

This filter element 10 is placed in an annular chamber 22 in the housing 20, and, as seen in FIG. 1, an elastomeric O-ring 30 is fitted between a step 24 formed on the wall of the housing 20 and the projection 16. This O-ring 30 is designed to prevent leaks between the cap 14 and the housing 20 so that the fuel cannot get around the filter. The fuel therefore passes radially through the filter body 12.

The structure illustrated in FIG. 1 may give satisfaction.

However, its operation is dependent on the presence of the O-ring 30, and if this is forgotten or incorrectly positioned, the filter 12 is useless.

The Applicant company has admittedly attempted to dispense with the O-ring 30 by adapting the positioning of the projection 16 and of the step 24 so that these would come into direct contact. However, these attempts did not prove satisfactory. Specifically, it is very difficult to prevent leaks satisfactorily around an annular surface of this kind between the step 24 and the projection 16.

Other solutions have been proposed in the literature. However, none gives complete satisfaction. Furthermore, as far as the Applicant company is aware, none of these proposed solutions has really reached an industrial production stage.

By way of non-exhaustive examples, the document DE-A-19718603 recommends the use of a zigzag elastic sealing structure, while documents DE-A-19711531 and DE-A-19646350 recommend sealing structures designed to be engaged/fitted onto opposing mating structures to prevent leaks by a labyrinth or equivalent effect.

The object of the present invention is to propose novel means to simplify filtration structures for motor vehicle fuel drawing assemblies.

This object is achieved in the context of the present invention with a drawing assembly comprising a housing possessing an annular chamber and a filter in said annular chamber, the assembly being characterized in that it comprises at least one annular plastic lip molded integrally on a part connected to the housing or to the filter, in a material capable of elastic deformation and shaped to form an oblique angle to the axis of the filter and of the housing chamber, in such a way that said lip rests, with elastic deformation, and at an angle with a tangential component via its free edge, against an opposite face, of the other of the filter or of the housing, arranged approximately transversely relative to the axis of the filter and of the housing chamber, in order to prevent leaks at this location between the filter and the housing.

In the context of the present invention, the annular lip is preferably molded integrally on a cap that fits on the filter.

Still more precisely, in the context of the present invention, the filter possesses an annular lip of this kind on each of its two end caps.

Other features, objects and advantages of the present invention will become clear on reading the following detailed description with reference to the attached drawings, which are given by way of non-limiting examples, and in which:

FIG. 1, described above, shows schematically the general structure of a filter for a drawing assembly in accordance with an arrangement proposed previously by the Applicant company, FIG. 2 shows schematically, in an exploded view prior to assembly, the general structure of a filter for a drawing assembly in accordance with the present invention and FIG. 3 shows an axial section through an alternative embodiment in accordance with the present invention, as assembled.

Once again in FIGS. 2 and 3 attached, a filter element 100 is arranged in a housing 200.

The filter element 100 is designed so that the fuel passes through it radially. This filter element 100 may be arranged ahead of or after an associated pump, which is preferably, in a manner known per se, an electrically driven pump.

The filter element 100 consists of an annular structure centered on an axis parallel to the axis marked O-O in FIGS. 2 and 3.

Still more precisely, the filter element 100 possesses a filter body 112 of annular geometry, made for example from a pleated piece of paper, arranged between two annular caps 120 and 130 at its axial ends.

Both caps 120, 130 may be identical. However, in the context of the invention, it is possible to have a filter element 100 equipped with different caps 120, 130 on each end.

Each of the caps 120, 130 has a generally U-shaped cross section in which the concavity is toward the filter body 112. The caps 120, 130 illustrated in FIGS. 2 and 3 thus possess a web 121, 131 lying on the axial edge face of the filter element 112 at right angles to the axis O-O and continued laterally by two respective flanges 122, 123; 132, 133, the first 122, 132 lying against the radially inner surface 113 of the filter body 112 and the second 123, 133 against the radially outer surface 114 of this body, parallel to the axis O-O.

The caps 120, 130 are advantageously made basically of a plastics material.

More precisely, the caps 120, 130 are preferably made basically from materials selected from the group comprising the polyacetals, polyamides and polyketones.

The housing 200 is also preferably made from a plastics material, preferably a material selected from the group comprising the polyacetals, polyamides and polyketones.

The housing 200 may be mounted on top of a reserve cup or bowl from which the fuel is drawn by the pump. Alternatively the housing 200 may be incorporated in this reserve cup or bowl.

The housing 200 defines an annular chamber 220 containing the filter 100.

This annular chamber 220 may be formed by joining together two shells 280, 290 which make up the housing 200.

In the present case, the annular chamber 220 is defined generally by two concentric cylindrical main walls 282, 284; 292, 294 centered on an axis parallel to the axis O-O.

These two main walls 282, 284; 292, 294 are connected by a base wall 286, 296 in the general form of an annulus extending in a general direction at right angles to the axis O-O.

It will be observed that, as a preference, each base wall 286, 296 is provided with an annular ridge 288, 298 which thus projects axially into the chamber 220. Consequently the top of each ridge 288, 298 can act as a bearing surface for the web 121, 131 of a cap 120, 130.

The ridges 288, 298 thus ensure that the filter 100 is positioned centrally in the chamber 220.

As can be seen in the accompanying figures, each cap 120, 130 comprises according to the invention a lip 126, 136 designed to prevent leaks against the opposite wall 286, 296 of the housing.

Each lip 126, 136 is molded integrally in plastic on the respective cap 120 or 130.

The lips 126, 136 are made in a plastics material capable of elastic deformation and they are shaped to form an oblique angle to the axis O-O of the filter 100 and of the housing chamber 220. Thus, in the context of the invention, each lip 126, 136 rests, with elastic deformation, and at an angle with tangential components, via its free edge 127, 137, against an opposite face 286, 296 of the shells 280, 290 of the housing, which face is arranged approximately transversely relative to the axis O-O of the filter 100 and of the chamber 220 of the housing.

In the particular embodiment illustrated in the accompanying figures, the lip 126, 136 is attached, at 125, 135, to the radially inner edge of the caps 120, 130.

From this area 125, 135 of connection to the cap 120, 130, the lip 126, 136 extends outward in a generally radial direction, that is to say away from the axis O-O, and simultaneously diverges from the outer face of the cap 121, 131 toward its free edge 127, 137.

Naturally, in an alternative form, the opposite arrangement can be adopted, that is to say lips 126, 136 attached to the radially outer edge of the caps 120, 130 and extending radially inward from this connection area while simultaneously diverging from the outer face of the caps 120, 130 toward their free edge.

In yet another alternative embodiment, the lips 126, 136 can be attached to the outer face of the caps 120, 130 at an intermediate point of the blades 121, 131, possessing an oblique orientation relative to the axis O-O, from this attachment area.

The lips 126, 136 may possess a rectilinear profile. Preferably, however, they possess a profile which is at least slightly rounded as illustrated in the attached figures.

Still more precisely, in the preferred embodiment illustrated in the attached figures, at the junction 125, 135 with the cap 120, 130, the lips 126, 136 extend in a generally axial direction, that is to say parallel to the axis O-O. The lips 126, 136 then turn and become oblique to the axis O-O. They thus possess along their main section an average inclination of between 60 and 80° relative to the axis O-O.

The lips 126, 136 preferably taper at least slightly toward their free edge.

In one particular embodiment illustrated in the attached figures, where the lips 126, 136 are attached to the radially inner edge of the caps 120, 130, the free edges 127, 137 of these lips are situated approximately over the middle of the web 121, 131 of the caps 120, 130.

In other words, then, the dimensions of the lips 126, 136 from their attachment areas 125, 135 to their free edges 127, 137 are approximately equal to one half of the width of the webs 121, 131 of the caps considered at right angles to the axis O-O.

In one particular embodiment, the length of the lips 126, 136 is thus of the order of 10 mm.

In another advantageous feature of the invention, the gap defined at rest between the free edge 127, 137 of the lips 126, 136 and the outer surface of the webs 121, 131 of the caps 120, 130 is advantageously of the order of 5 mm.

In another advantageous feature of the invention, the average thickness of the lips 126, 136 is of the order of 1 mm.

As seen in FIG. 2, in an alternative embodiment of the present invention, each lip 126, 136 can be provided in the vicinity of its free edge 127, 137 with a protuberance 128, 138 projecting from the outer surface of the lip 126, 136. The function of this protuberance 127, 137 is to ensure contact between the lip 126, 136 and the wall 286, 296 of the housing, limited to the free edge of the lip.

This arrangement ensures there is an elastic and leaktight contact between the lip 126, 136 and the housing 200.

However, it will be seen that such a protuberance 127, 137 is not indispensable. FIG. 3 thus illustrates an alternative embodiment in which the lips 126, 136 include no such protuberance.

When the filter 100 equipped with the caps 120, 130 is assembled into the housing shells 280, 290, the free edges 127, 137 of the lips 126, 136 press against the walls 286, 296 of the housing, and are then progressively deformed elastically toward the webs 121, 131 of the caps 120, 130 in order to prevent leaks through the assembly.

Clearly, the height of the chamber 220, that is the dimension of this chamber 220 taken parallel to the axis O-O, must be greater than the height of the filter, that is the distance between the outer surfaces of the webs 121, 131 of the caps 120, 130, but less than the distance at rest between the free edges 127, 137 of the lips 126, 136 in order to ensure that the lips 126, 136 do come under this elastic deformation.

During operation, the chamber 220 is filled with fuel. The sealing lip 126, 136 is thus itself immersed in fuel. As a consequence, the volume of the lip 126, 136 tends to swell up in such a way that, after assembly, during operation, the lip 126, 136 is automatically pressed against the opposite wall 286, 296 of the housing and creates a sufficient seal between the cap 120, 130, respectively, and the housing 200 to ensure that no fuel gets around the outside of the filter 100. This arrangement ensures that fuel passing through the pump also passes radially through the filter body 112.

It will be remembered that, as indicated earlier, such a filter 100 may be located ahead of or after the pump.

The configuration proposed in accordance with the present invention offers numerous advantages over the prior art.

In the first place, it will be seen that the present invention notably simplifies the assembly because it does away with the need to check for the presence of a seal. The mere process of assembling the filter body 112 with its caps 120, 130 into the chamber 220 guarantees a sufficient seal between the two compartments situated one on either side of the filter body 112, to prevent contamination of the fuel downstream thereof in the direction of movement of the fuel, because the close contact defined between the lip 126, 136 and the housing 200 makes it impossible for fuel to get around the outside of the filter body, in the form of a dribble between the filter body 100 and the housing 200, largely because of the fact that the upstream and downstream compartments of the filter system, lying on either side of the filter 100, are at roughly the same pressure as each other.

The lips 126, 136 fulfill the above function by the combination of two characteristic features: the elastic stress produced by deformation of the lip 126, 136 during assembly on the one hand, and the swelling of the lips following soaking in the fuel on the other.

In addition, the present invention saves time and money.

Furthermore, it uses conventional housings 200, that is housing structures requiring no particular complex structure.

The present invention is not of course limited to the particular embodiments described above but rather extends to all alternative embodiments that conform with its essential nature.

In the context of the present invention, the housing 200 and the caps 120, 130 may be made of one identical plastics material or a variety of different plastics materials, optionally with one filled and the other not filled. The essential point is that the part on which the lips 120, 130 are carried is made from a material capable of elastic deformation, and also preferably of swelling significantly when the lip is immersed in the fuel.

In one alternative embodiment of the invention, only one of the caps 120, 130 is provided with an elastic lip as described earlier.

In another alternative embodiment, at least one of the elastic sealing lips is located on the housing, molded integrally on a wall 286 or 296 and adapted to rest against the outer surface of the webs 121, 131 of the caps 120, 130.

What is claimed is:

1. Motor vehicle fuel drawing assembly comprising a housing possessing an annular chamber and a filter in said annular chamber, the assembly comprising at least one annular plastic lip molded integrally on a part connected to the housing or to the filter, in a material capable of elastic deformation and shaped to form an oblique angle to an axis of the filter and of the housing chamber such that said lip rests, with elastic deformation, and at an angle with tangential components via its free edge against the opposite face of the other of the filter or of the housing arranged approximately transversely relative to the axis of the filter and of the chamber of the housing in order to prevent leaks at this location between the filter and the housing wherein each base wall of the housing at right angles to the axis of the filter is designed to act as a bearing surface for a lip, and is provided with a projecting annular ridge.

2. Assembly according to claim 1, wherein the annular lip is molded integrally on a cap that fits on the filter.

3. Assembly according to claim 1, wherein the filter possesses an annular lip on each of these two end caps.

4. Assembly according to claim 1, wherein the lip is made of a material selected from the group comprising the polyacetals, the polyamides and the polyketones.

5. Assembly according to claim 1, wherein the axial height of the annular chamber taken parallel to the axis of the filter, is greater than the height of the filter body and less than the distance at rest between the free edge of two lips situated one on each of the end caps of the filter body.

6. Assembly according to claim 1, wherein the lip is attached to the radially inner edge of a cap of the filter.

7. Assembly according to claim 1, wherein the lip is attached to the radially outer edge of the cap of the filter.

8. Assembly according to claim 1, wherein the lip is attached to an intermediate part of a cap of the filter.

9. Assembly according to claim 1, wherein each lip has a generally rounded profile.

10. Assembly according to claim 1, wherein each lip possesses a body inclined by an angle of around 60 to 80° relative to the axis of the filter.

11. Assembly according to claim 1, wherein the lip tapers toward its free edge.

12. Assembly according to claim 1, wherein the free edge of the lip is situated approximately over the middle of a cap on which it is carried.

13. Assembly according to claim 1, wherein the length of the lip is of the order of 10 mm.

14. Assembly according to claim 1, wherein at rest, the distance between the free edge of a lip and the outer surface of the blade of the cap on which it is carried, is of the order of 5 mm.

15. Assembly according to claim 1, wherein the average thickness of the lip is of the order of 1 mm.

16. Assembly according to claim 1, wherein the lip is provided, on its free edge with a protuberance projecting from its outer surface.

* * * * *